United States Patent [19]
DiPaola

[11] Patent Number: 5,333,935
[45] Date of Patent: Aug. 2, 1994

[54] SEAT BELT SYSTEM PROVIDING INCREASED OCCUPANT MOBILITY

[75] Inventor: Donald A. DiPaola, Mount Clemens, Mich.

[73] Assignee: AlliedSignal Inc., Morristown, N.J.

[21] Appl. No.: 968,027

[22] Filed: Oct. 29, 1992

[51] Int. Cl.$^5$ ............................................. B60R 22/12
[52] U.S. Cl. .................................... 297/471; 297/472
[58] Field of Search .............. 280/746; 297/470, 471, 297/476, 472

[56] References Cited

U.S. PATENT DOCUMENTS 3,891,272  6/1975  Takada ................................ 297/472

FOREIGN PATENT DOCUMENTS 1180364  7/1957  France .................................. 297/472

Primary Examiner—Rodney M. Lindsey
Attorney, Agent, or Firm—Markell Seitzman

[57] ABSTRACT

A seat belt system comprising a length of webbing (20) adapted to secure an occupant to a seat; first locking element such as a tongue (24) receivable into second locking element such as a buckle (26), a portion of the buckle being fixedly positioned relative to the seat; a retractor (22) for retracting excess webbing; the webbing supporting a loop (40) of elastic material for resiliently coupling the webbing (20) to the tongue such that the webbing can move relative to the tongue in response to occupant motion and wherein a portion of the webbing (20) proximate the tongue is formed into a second loop (42), which limits the extension of the elastic loop (40) when the webbing is under tension.

10 Claims, 2 Drawing Sheets

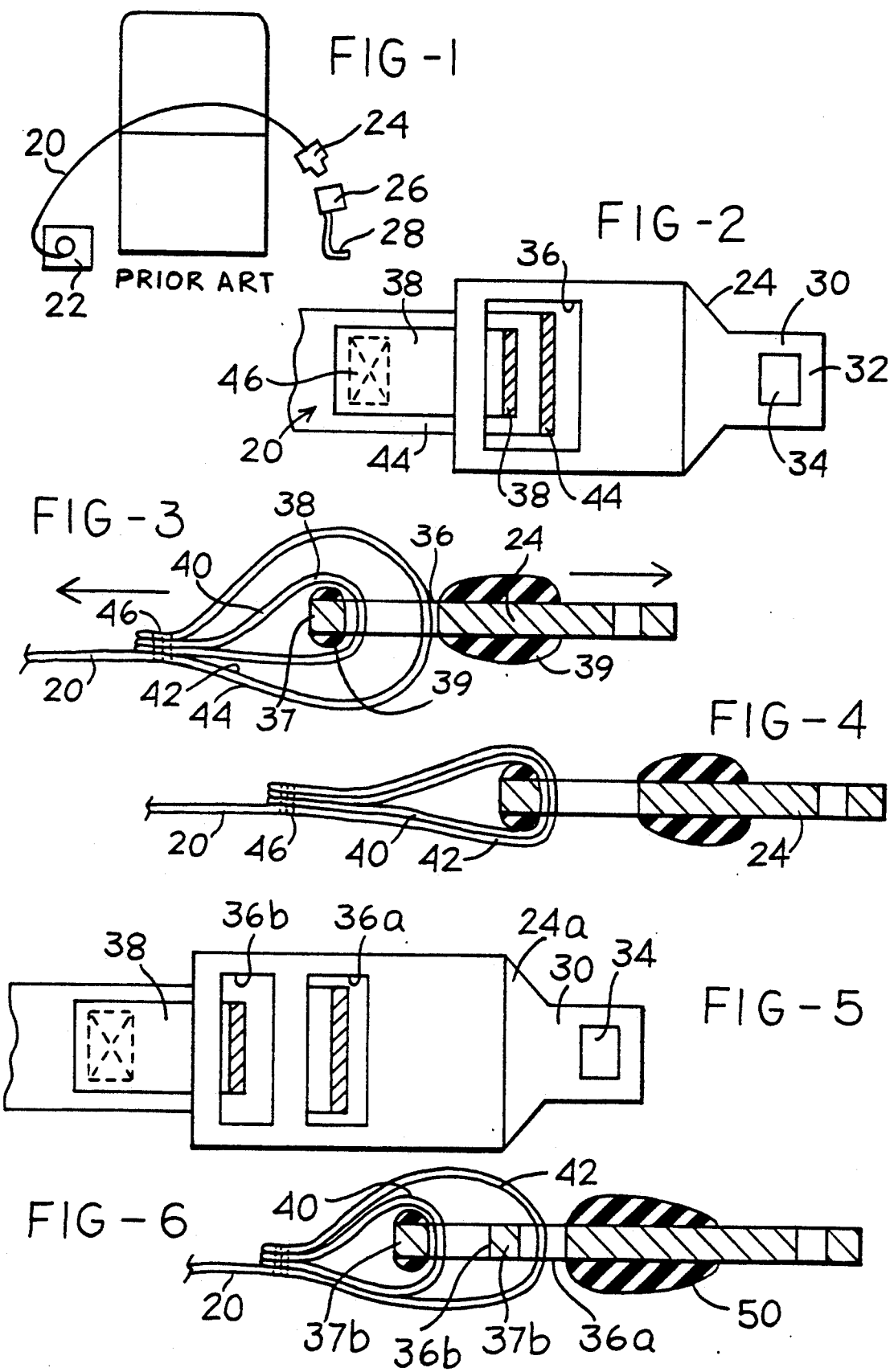

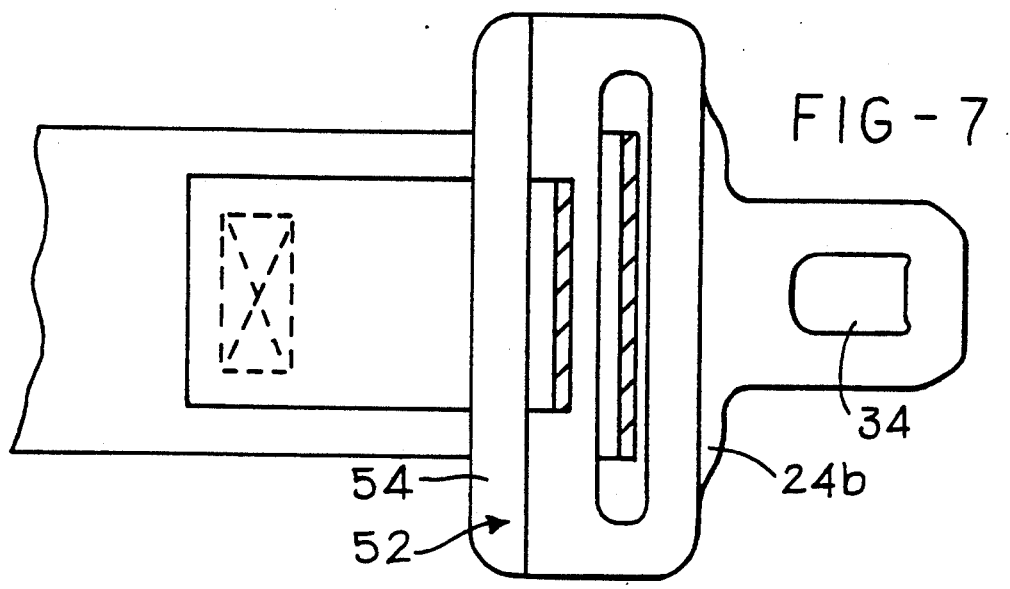
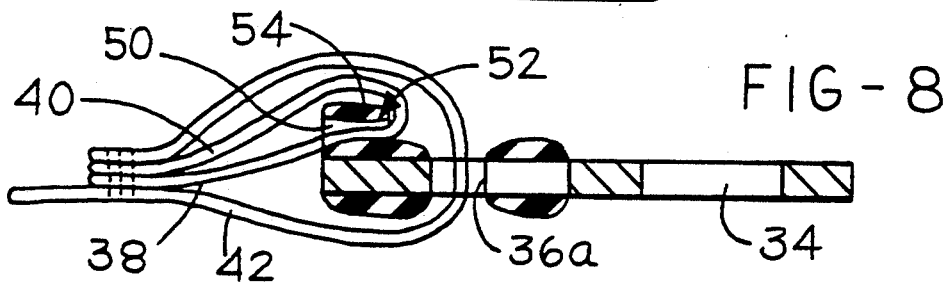
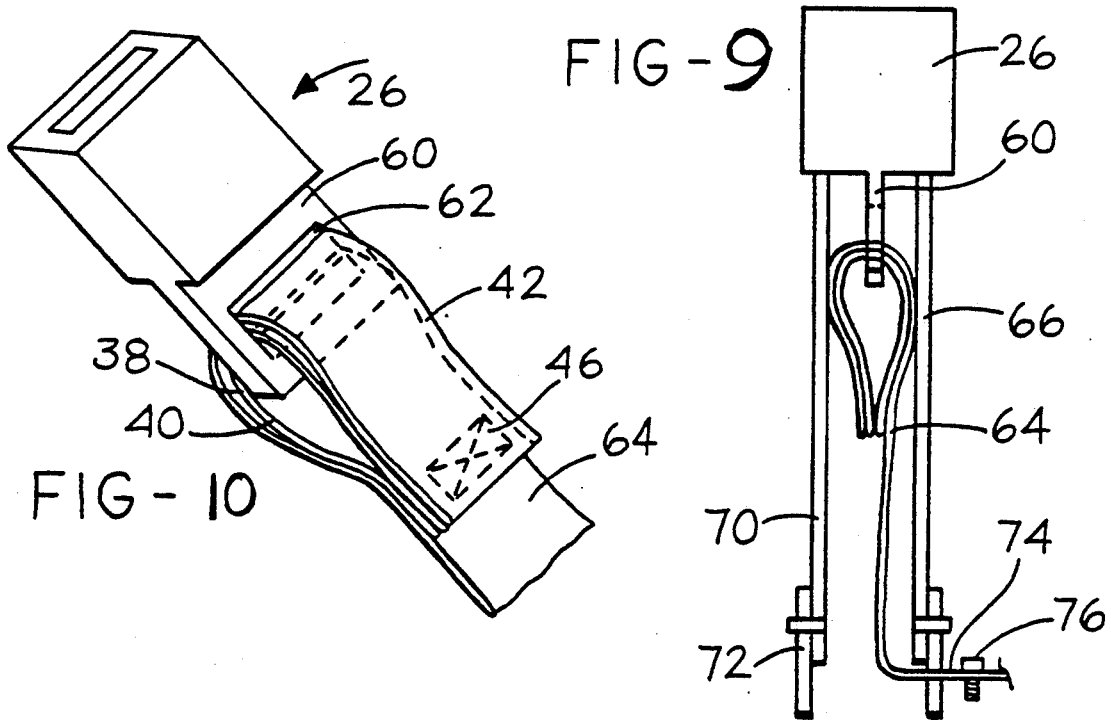

SEAT BELT SYSTEM PROVIDING INCREASED OCCUPANT MOBILITY

BACKGROUND AND SUMMARY OF THE INVENTION

The present invention relates to a seat belt system for securing an occupant to a seat and more particularly to a system which includes means for providing greater mobility to the occupant.

Reference is made to FIGURE I which diagrammatically illustrates a typical seat belt system comprising a length of webbing 20 wound about a retractor 22. The other end of the webbing terminates at a tongue 24 adapted to be received within a buckle 26 which in turn is secured to the vehicle or vehicle seat at 28. With regard to the retractor 22 it typically will be of the emergency locking variety (ELR) or the automatic locking (ALR) variety. In the ELR type of retractor the occupant is free to move within the seat as the retractor does not lock up until an emergency situation occurs. However, the use of an ALR type of retractor does not afford the system user the same increased mobility, since after the tongue 24 is seated within the buckle 26 the ALR type of retractor will retract excess webbing 20 and then lock the webbing tightly about the occupant. As a consequence, the occupant cannot move forward or even twist or rotate within his/her seat because of the operation of the ALR retractor.

In order to provide the system user with increased mobility, the prior art illustrates an anti-cinch tongue assembly in which the steel load plate of the tongue is telescopically movable relative to a housing. In this type of a system after the tongue has been seated within the buckle and the user moves or rotates within his/her seat, the housing and load plate can move relative to one another. During an emergency situation the housing and load plate of the tongue become fully extended and the permitted motion of the occupant is limited.

It is an object of the present invention to provide a simple, novel replacement to the above-described system providing for a reduction in the cost of material, labor, size and weight.

Accordingly, the invention comprises: a seat belt system comprising a length of webbing adapted to secure an occupant to a seat; first locking means receivable into second locking means, a portion of the second locking means being fixedly positioned relative to the seat; retractor means for retracting excess webbing; the webbing supporting first means for resiliently coupling the webbing to the first locking means such that the webbing can move relative to the first locking means in response to occupant motion and wherein a portion of the webbing proximate the first means, includes second means, coupled to the first locking means for limiting extension of the first means to a maximum amount when the webbing is under tension.

Many other objects and purposes of the invention will be clear from the following detailed description of the drawings.

BRIEF DESCRIPTION OF THE DRAWINGS

In the drawings:

FIG. 1 diagrammatically illustrates a typical seat belt system.

FIGS. 2 and 3 illustrate a first embodiment of the invention.

FIG. 4 illustrates a tongue and webbing in an extended condition.

FIGS. 5 and 6 illustrate a second embodiment of the invention.

FIGS. 7 and 8 illustrate a third embodiment of the invention.

FIG. 9 illustrates a projected view of the fourth embodiment of the invention.

FIG. 10 illustrates a cross-sectional view of the fourth embodiment of the invention.

DETAILED DESCRIPTION OF THE INVENTION

Reference is made to FIGS. 2 and 3 which illustrate a first embodiment of the invention. FIG. 2 illustrates the connection of the webbing 20 to a tongue 24. The tongue 24 is of the non-cinching variety. A non-cinching tongue is essentially a tongue devoid of a mechanism which is utilized to clamp, clasp or cinch the webbing. As can be seen from FIGS. 2 and 3, the tongue 24 includes a load plate 30 having a tongue member 32 with an aperture 34 therein. The aperture is typically engaged by a locking element within a cooperating buckle 26. The tongue 24 further includes a second aperture 36 adjacent a bar portion 37 thereof. The tongue also includes a housing portions 39 molded to the load plate. A length of elastic material 38 is formed into a loop generally shown as 40 and positioned within another loop 42 formed at the end 44 of the webbing 20. The ends of the elastic material 38 and the webbing 20 are generally sewn together at location 46 defining a typical sewn securement pattern as often used to secure a tongue to webbing. As can be seen in both FIGS. 2 and 3, the elastic material 38 and the loop 42 of webbing are inserted within the opening 36 of the tongue 24. As can be seen from FIG. 3, the loop 40 formed of the elastic material is smaller than the loop 42 formed by the webbing 20. In operation the tongue 24 is inserted within the buckle. If the retractor 22 is an automatic locking retractor, the webbing will also be locked in place at the retractor side. As the retractor 22 rewinds excess webbing it causes the loop 40 to be placed in tension. Thereafter the retractor will rewind excess webbing pulling the webbing, but not the webbing loop 42 relatively tight and gently stretching or flattening the elastic loop 40 in a manner as shown in FIG. 3. The spring constant or elasticity of the elastic material 38 should be chosen so that it will not stretch much in response to the rewind forces imparted by the retractor. As can also be seen in FIG. 3, when the webbing is secured about the occupant the loop 42 formed of the webbing does not forcefully couple the webbing to the tongue. An advantage of this construction is that the occupant can now move, twist and/or rotate in a limited manner, thereby stretching the elastic 38 as the webbing is free to move relative to the tongue. When the occupant returns to the normal seated position the elastic loop 40 will contract to its original shape to maintain the webbing 20 about the torso of the occupant. During a crash situation the occupant will tend to move forwardly thereby stretching the elastic loop 40 to its maximum elongation as illustrated in FIG. 4. The maximum elongation is established by the size of the webbing loop 42 which is then pulled tight thereby directly connecting or coupling the webbing 20 and the tongue to safely secure the occupant to the seat with no further elongation permitted.

Reference is made to FIGS. 5 and 6 which illustrate a further embodiment of the invention. These figures illustrate a tongue 24a which is identical in construction to tongue 24 with the exception that it includes two slots 36a and 36b and two bar portions 37a and 37b. In this embodiment of the invention the elastic loop 40, while still being fastened to the webbing 20, is threaded through the opening 36b and the larger loop 42 of webbing material is threaded through opening 36a. The operation of the system with the above tongue 24a is substantially identical to that described above.

Reference is now made to FIGS. 7 and 8 which illustrate a further embodiment of the invention. The tongue 24b illustrated therein also includes two openings or slots which are positioned slightly differently than the two slots shown in FIGS. 5 and 6. The tongue 24b includes a first slot 36a positioned within the tongue plate 34 and includes a second, horizontally extending, elevated slot 50 formed within a plastic housing 52 which may be injection molded to the plate 34. As can be seen, the elastic loop 40 extends horizontally through the opening 50 and then about top bar 54 which is integrally formed as part of the housing. By permitting the elastic loop 40 and the webbing loop 42 to enter different openings, as also done in FIGS. 5 and 6, it has been found that the tongue is cradled by the separated loops 40 and 42 in a manner that the plane of the tongue is generally parallel to the webbing proximate the tongue. This construction will make it easier for the occupant to more easily grab the tongue and insert it in its buckle.

As can be appreciated from the above, the utilization of the elastic loop effectively provides the system an additional degree of freedom as it expands. It should be apparent that the resilient coupling provided by the material 38 need not only be attached to the tongue 24 but also can be attached to a buckle 26. Reference is made to FIGS. 9 and 10 which illustrate another embodiment of the invention wherein the elastic material is attached to the buckle 26. As shown the buckle 26 includes a flange 60 having at least one opening 62. The buckle can also include the two openings as used in the tongue of FIGS. 6 and 8. The length of webbing 64 is formed into a loop 42 similar to that described above with elastic material 38 forming smaller loop 42 secured thereto. The other end of the webbing 64 may be appropriately secured to the vehicle and/or seat. FIG. 10 illustrates a mounting arrangement in which the webbing 64 and buckle flange 60 are received within a hollow, typically plastic sleeve 66. The lower end 70 of the sleeve may be pivotally mounted on a bracket 72 to facilitate the positioning of the buckle in or next to the seat. The extending end 74 of the webbing 64 is fixedly secured to the seat or vehicle by a fastener 76. In operation the tongue is lockingly latched to the buckle 26. Thereafter the retractor 22 will remove in the slack in the length of webbing, extending across the occupant's torso, attached to the tongue. If the occupant desires to move, the buckle can now move outwardly relative to the length of webbing 64 as the elastic loop expands and contracts. In a crash situation the tongue pulls the buckle 26 outwardly stretching the elastic loop 40 to its maximum at which time the loop 42 formed of webbing material securely connects the buckle 26 to the webbing 64 which as mentioned above is fixedly attached to the seat or cooperating structure.

Many changes and modifications in the above described embodiment of the invention can, of course, be carried out without departing from the scope thereof. Accordingly, that scope is intended to be limited only by the scope of the appended claims.

I claim:

1. A seat belt system comprising:
   first locking means (24;26) lockingly engagable with second locking means (26;24); one of the first locking means and second locking means attached to a securing part; wherein a portion of the securing part (20) supports elastic material, connected to a first bar (37) of the first locking means, and first means (42) for limiting extension of the elastic material to a maximum amount when the system is under tension, wherein the first means includes a portion formed into a first loop, the first loop being received about a second bar in the first locking means.

2. The system as defined in claim 1 wherein the securing part is a first length of seat belt webbing.

3. The system as defined in claim 1 wherein the first locking means and the second locking means is one of a tongue and buckle.

4. The system as defined in claim 1 wherein one of the first locking means and the second locking means is positioned adjacent to a seat.

5. The system as defined in claim 4 wherein the first locking means is movably secured to a hollow sleeve with the webbing within the sleeve, an end of the webbing opposite the first locking means being fixedly secured near an opposite end of the sleeve.

6. The system as defined in claim 5 wherein the opposite end of the sleeve is rotatable.

7. The system as defined in claim 1 wherein the elastic material is formed as a second loop about the first bar.

8. The system as defined in claim 7 wherein the first loop is larger than the second loop.

9. The system as defined in claim 1 wherein the second locking means is attached to a second length of seat belt webbing.

10. The system as defined in claim 9 including a retractor means (22) for retracting excess webbing about an occupant.

* * * * *